(12) United States Patent
Banker et al.

(10) Patent No.: US 6,275,600 B1
(45) Date of Patent: Aug. 14, 2001

(54) MEASURING IMAGE CHARACTERISTICS OF OUTPUT FROM A DIGITAL PRINTER

(75) Inventors: Yigal J. Banker, Chestnut Hill; David E. Monks, Lexington; Lee E. Phillips, Wellesley; David M. T. Ting, Sudbury, all of MA (US)

(73) Assignee: i.data International, Inc., Arlington, VA (US)

( * ) Notice: Subject to any disclaimer, the term of this patent is extended or adjusted under 35 U.S.C. 154(b) by 0 days.

(21) Appl. No.: 09/036,563

(22) Filed: Mar. 9, 1998

(51) Int. Cl.[7] .................................................. G06K 9/00
(52) U.S. Cl. ............................................ 382/112; 358/406
(58) Field of Search .................................... 382/112, 286, 382/287; 348/88, 125, 128; 356/430, 237.2; 358/504, 406

(56) References Cited

U.S. PATENT DOCUMENTS

| | | | |
|---|---|---|---|
| 4,878,753 | * 11/1989 | Nestmeier | 356/237 |
| 5,018,213 | * 5/1991 | Sikes | 382/8 |
| 5,078,666 | 1/1992 | Porret et al. | 493/1 |
| 5,125,037 | 6/1992 | Lehtonen et al. | 382/8 |
| 5,138,667 | * 8/1992 | Roch et al. | 382/1 |
| 5,327,252 | * 7/1994 | Tsuruoka et al. | 358/406 |
| 5,365,310 | 11/1994 | Jenkins et al. | 355/202 |
| 5,416,613 | * 5/1995 | Rolleston et al. | 358/518 |
| 5,642,202 | * 6/1997 | Williams et al. | 358/406 |
| 5,712,921 | 1/1998 | Zabele | 382/112 |
| 5,748,330 | * 5/1998 | Wang et al. | 358/298 |
| 5,760,913 | * 6/1998 | Falk | 358/298 |
| 5,999,636 | * 12/1999 | Juang | 382/112 |
| 6,081,608 | * 6/2000 | Fujii et al. | 382/112 |

* cited by examiner

Primary Examiner—Andrew W. Johns
(74) Attorney, Agent, or Firm—Jacobson Holman, PLLC

(57) ABSTRACT

Measuring the printed image characteristics of printed output from a digital printer by sending test pattern data to a digital printer and generating a printed image of the test pattern data. The printed image is scanned, and digital pattern data is output. The digital pattern data is analyzed to generate one or more quantitative ratings with respect to one or more printed image characteristics.

53 Claims, 7 Drawing Sheets

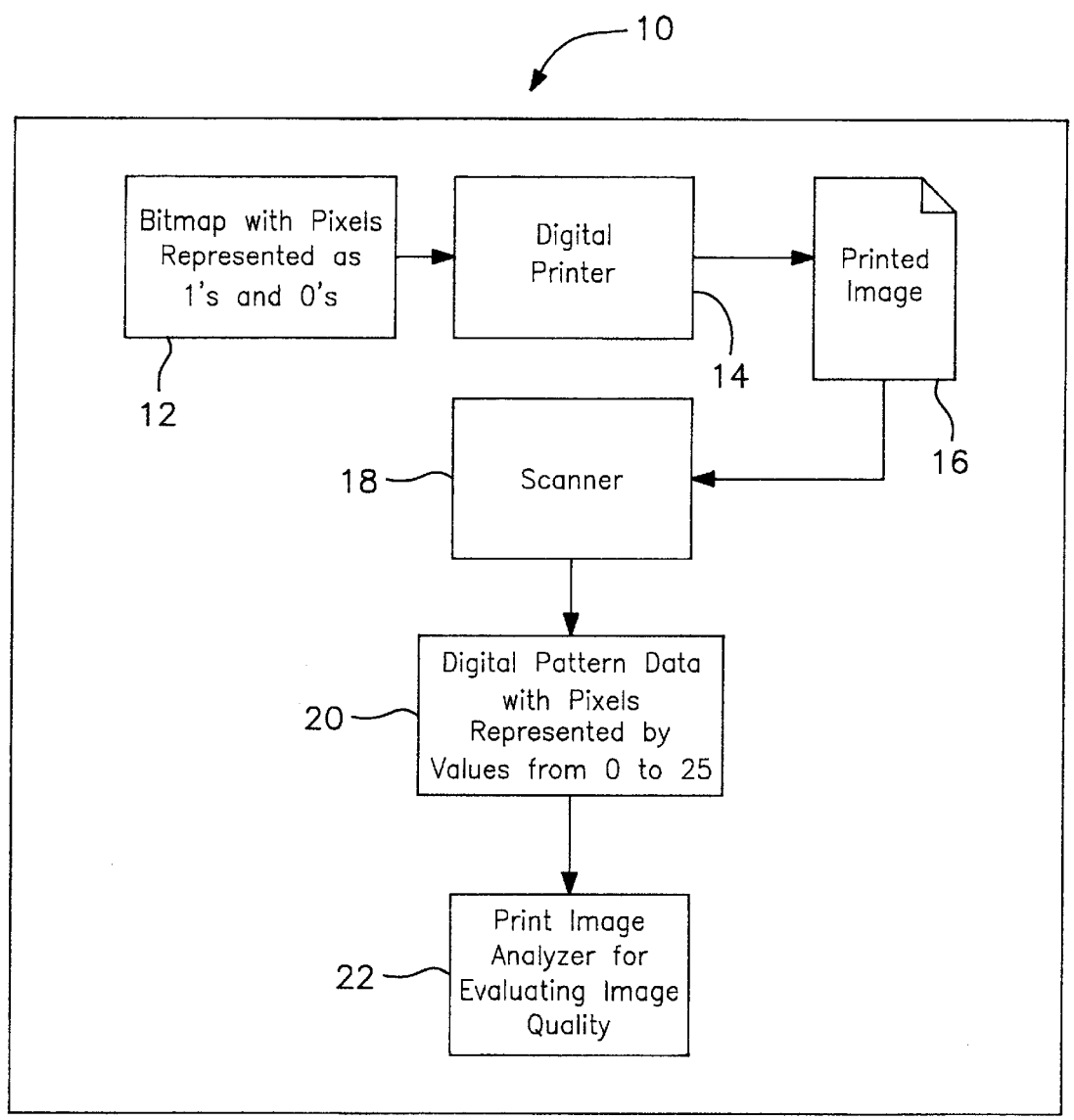

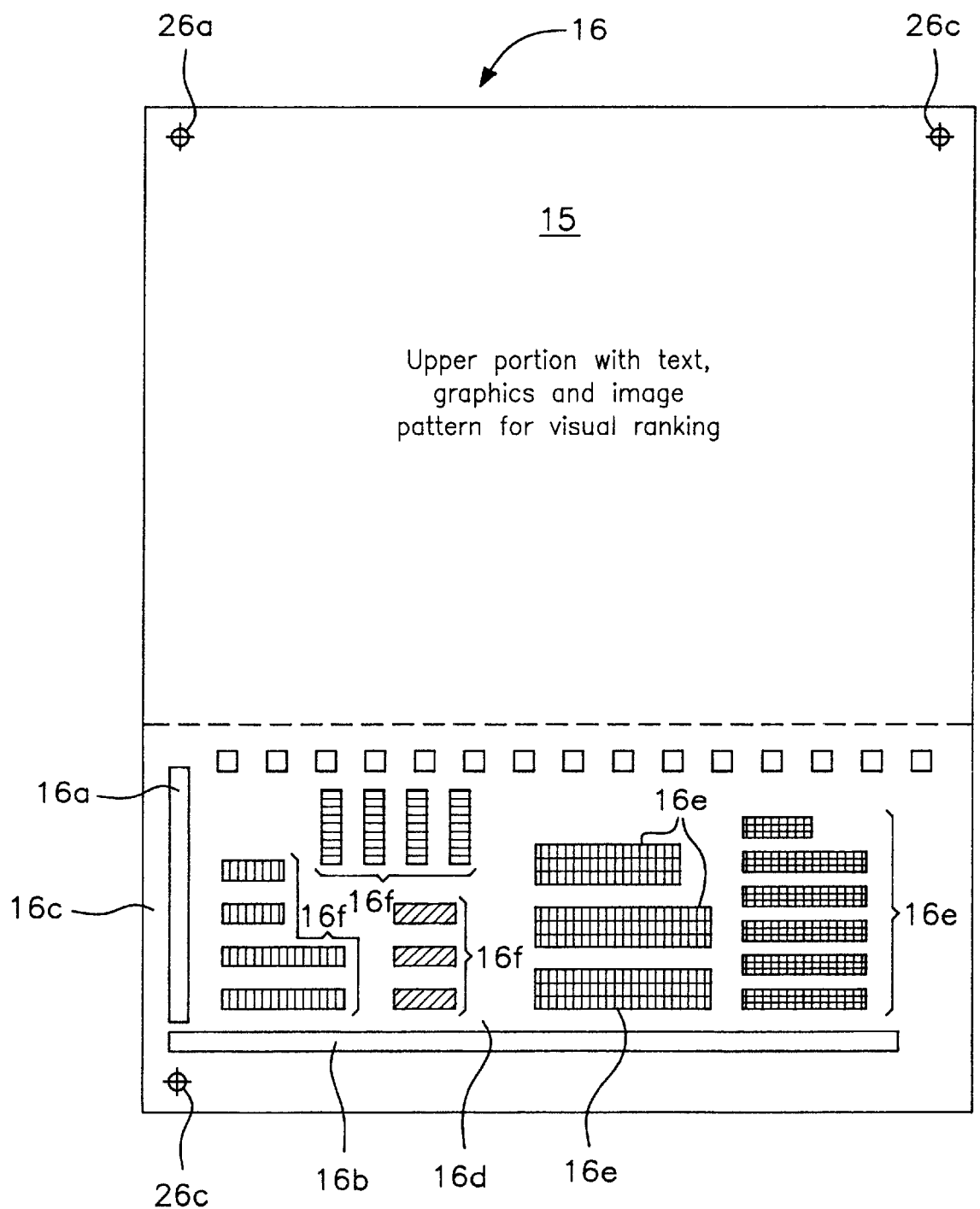

MEASURING IMAGE CHARACTERISTICS OF OUTPUT FROM A DIGITAL PRINTER

BACKGROUND OF THE INVENTION

This invention relates to measuring image characteristics of printed output from a digital printer.

A digital printer receives electronic digital input data in the form of a bitmap (in which there is one bit per pixel), and outputs a printed sheet. The input data are typically received serially in a raster pattern and are used to control the deposit of toner from a drum to a sheet of paper.

Many factors can cause the print quality of a digital printer to deteriorate over time. Traditionally, assessments of this degradation have been done subjectively, as a user tries to match the printer's image quality with his or her subjective perception of ideal output.

Generally, printed sheets are manually inspected to determine quality. The user generates a test page and judges its quality by mentally recalling the appearance of the test page when the printer was new or last serviced. The user can also compare the test page to samples in a "limits" book, which defines the lower bounds for standard printer output. An actual printed image may have defects such as white pinholes in black areas, smears, or blurry edges. Some defects may be acceptable and some may fall below an acceptable quality level. Based on manual inspection, the user rejects printed sheets or makes adjustments to the printer.

A technician performing preventive maintenance may obtain readings of the print density uniformity by using a densitometer, which measures light reflected from a page. These readings only partially correlate with human judgments of print quality. Therefore, unless there is a dramatic shift in quality, or a noticeable defect such as streaking, users have difficulty detecting subtle or gradual changes in quality. With color output, detecting changes is even more difficult since the eye is poor at identifying absolute colors.

SUMMARY OF THE INVENTION

In one aspect, the invention features, in general, measuring image characteristics of printed output from a digital printer by sending test pattern data to the digital printer, generating a printed image of the test pattern data at the digital printer, scanning the printed image to obtain digital pattern data, and analyzing the digital pattern data of the printed image. The test pattern that is printed includes target objects designed to reveal specific printed image characteristics, and the analysis of the data from scanning the printed image includes the generation of one or more quantitative ratings with respect to printed image characteristics.

In other aspects, the invention features computer programs, print systems, digital printers, test instruments, and services that carry out the method of measuring print image characteristics just described.

Embodiments of the invention may include one or more of the following features. The quantitative ratings can include measurements of the black and white densities, uniformity, edge sharpness, resolution, and positional accuracy of the target objects. The measurements also detect defects, such as streaks and smears. Landmarks in the test pattern are used to correct for scanner error.

One or more quality ratings can be generated from the measurements. Using these ratings, one can automatically monitor and adjust the print image characteristics of a digital printer so that the printer is within allowable margins. For example, one can use the measurements to adjust print engine related parameters such as power and duration of the laser, and charging current. The method is applicable to black and white as well as color printing applications.

Other aspects and advantages of the invention will be apparent from the drawings taken together with the accompanying description.

BRIEF DESCRIPTION OF THE DRAWINGS

FIG. 1 is a diagram of a print analyzer system in accordance with the invention;

FIG. 2 is an illustration of test pattern data;

DETAILED DESCRIPTION

Figure 3A:
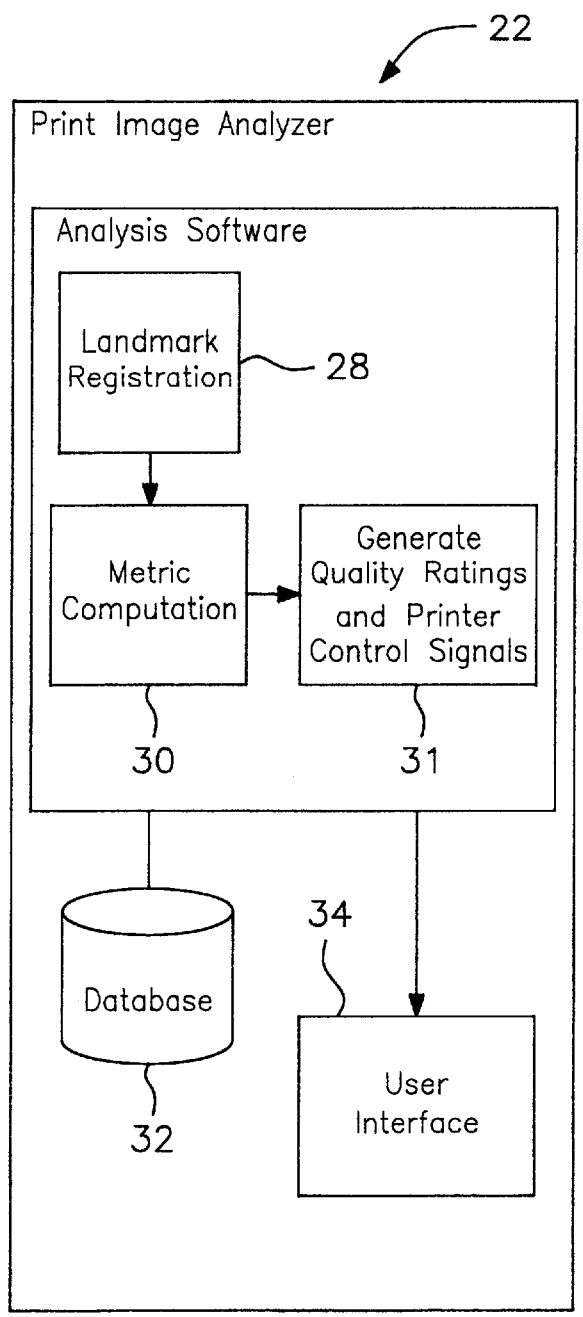
FIG. 3A is a diagram of the print quality analyzer components.

Referring to FIG. 1, print analyzer system 10 is shown. Bitmap 12 represents a raster image for a test pattern that is input to a black and white digital printer 14 being evaluated. Each bit defines whether a corresponding pixel is black or white. The output of digital printer 14 is printed image 16 on a sheet of paper. Bitmap 12 may be produced by scanning a printed test pattern to generate a raster image, may be generated electronically in the first instance, or may be based on a combination of inputs.

To measure the image characteristics of output from digital printer 14, printed image 16 is scanned by scanner 18, and the output from scanner 18, namely electronic digital pattern data 20, is analyzed for print image characteristics at print image analyzer 22, which is implemented in a personal computer. Scanning is done by feeding printed image 16 into a high-resolution scanner or by having digital printer 14 route printed image 16 directly to a built-in scanner (see FIG. 5). Scanner 18 does not have to operate at the rated printer speed since it is only used to perform image measurements. However, scanner 18 must have sufficient spatial resolution to capture the details in printed image 16. In general, scanner 18 should have at least twice the resolution, both horizontally and vertically, as printer 14 being evaluated. Digital printer 14 can also route a test page to scanner 18 during normal high speed printing operations, thereby testing a printed sheet at a random or pre-defined interval in a printer's output cycle.

Scanner 18 outputs digital pattern data 20, which is a high resolution digital representation of printed image 16. Digital pattern data 20 is a rectangular array of numerical values stored in memory. There are 8 bits per scanner pixel; these numerical values range from 0, which denotes pure black, to 255, which denotes pure white. The data for the image on printed image 16 are stored in a buffer thereafter accessed by print image analyzer 22. Values between 0 and 255 are variations from pure black to pure white. Print image analyzer 22 evaluates the print image characteristics of the scanned image by conducting a series of tests on digital pattern data 20. Based on the tests, print image analyzer 22 generates quality ratings and/or control signals to make adjustments to digital printer 14. For example, print image analyzer 22 can indicate that adjustments should be made to bias voltages, surface charge levels, laser exposure levels, and printer speeds in digital printer 14. If an adjustment can be made using software (e.g., by setting parameters in control memory for digital printer 14), print image analyzer 22 can send commands to adjust the appropriate parameters, measure the resulting quality, and then iteratively adjust them.

Referring to FIG. 2, test image 16 includes target objects designed to reveal specific imaging characteristics of digital printer 14. The upper portion 15 of printed image 16 contains samples of different text, graphics, and image patterns and is intended for visual quality ranking (not shown). Approximately the lower third of printed image 16 contains target objects 16a–f that are analyzed without human intervention. Target objects 16a–f are test patterns designed to indicate image defects and are analyzed to evaluate print image characteristics. They are shown diagrammatically on FIG. 2 and described in more detail below. In the corners of printed image 16 are landmarks 26a, 26b, 26c. Before evaluating the image, print image analyzer 22 has a landmark registration process to compensate for imperfect scanners and to identify the expected locations in the buffer for target objects 16a–f.

To compensate for imperfect scanners, the print analyzer system aligns digital pattern data 20 with a template to account for any skewing or margin deviations between digital printer 14 and scanner 18. Print image analyzer 22 stores a template in memory that represents the ideal location of pixels within landmark 26a and uses a signal processing/statistical process that employs a cross correlation function to locate the first landmark 26a. The cross correlation function sums the product of each pixel within the template and a corresponding pixel within a search area in digital pattern data 20 where landmark 26a is expected to be located. The search process is iterative and correlates the template with a number of x,y locations for the stored digital pattern data. The correlation between a template T placed at (p,q) within the scanned image S is computed as $$C(p,q) = \Sigma T(x,y) * S(x-p, y-q)/K$$

for all x,y within the template, and where the normalizing coefficient K is computed as $$K = \Sigma T(x,y) * T(x,y)$$

for all values of x,y within the template. This is done when the template is placed at different p, q values. The range of p, q values to use is determined from a setup file.

The highest correlation is obtained when the template is positioned over landmark 26a, thus determining the position of the first landmark 26a. The position (p,q) where C(p,q) is maximized for a given search area is used for the midpoint of landmark 26a. After finding the first landmark 26a, landmark 26b and landmark 26c are located in a similar manner.

Accounting for three landmarks, rather than only two, allows linear variations in the X and Y directions of scanner 18 to be corrected. Print image analyzer 22 measures the distances between landmarks 26a, 26b, and 26c, compares the actual distances with the ideal distances, and calculates X and Y correction factors. Using these correction factors, digital pattern data 20 is "stretched" or "warped." For example, if the ideal distance between landmark 26a and landmark 26b were 6000 pixels and the actual measurement was 5900 pixels, a linear scaling in Y of 6000/5900 would correct the scanning error. Thus, using the formula Y'=Y*Correction would account for scanner slippage in Y.

After correcting digital pattern data 20 for scanner error, individual target objects 16a–f are located using relative positioning techniques. White space that surrounds the target objects and that is not part of target objects 16a–f is removed by dividing digital pattern data 20 into smaller images, one image per target object 16a–f. This technique of isolating target objects provides a more efficient use of memory because pixels representing white space are not stored.

Relevant physical measurements (referred to as "metrics" herein) known to affect print image characteristics are calculated for each target object 16a–f. Computing a density distribution for a given target object and locating the boundaries of a target object are common techniques used by several image characteristic measurements carried out by print image analyzer 22. These techniques will be described first.

A number of metrics require the density distribution for a respective target object 16a–f. The density distribution can be depicted as a histogram showing a density range from 0 through 255 along the X axis and the number of pixels within each density range measured along the Y axis. Generally, values between 0 and 127 are black, and values between 128 and 255 are white. Pb(d) and Pw(d) represent the frequency of black and white pixels, respectively, in a target object. Values for Pb(d) and Pw(d) range from 0.0 to 1.0. The means $M_b$ and $M_w$ of the black and white distributions are the average black and white densities within a black and white target. $M_b$ and $M_w$ are computed as $$M_b = \Sigma d * Pb(d), \text{ for } d=0 \text{ to } 255$$

$$M_w = \Sigma d * Pw(d), \text{ for } d=0 \text{ to } 255$$

Variances $V_b$ and $V_w$ on a scale of 0–255, of the black and white distributions represent how close the densities are to $M_b$ and $M_w$ within a black or white target. $V_b$ and $V_w$ are computed as $$V_b = \Sigma d^2 * Pw(d) - M_b * M_b, \text{ for } d=0 \text{ to } 255$$

$$V_w = \Sigma d^2 * pw(d) - M_w * M_w, \text{ for } d=0 \text{ to } 255$$

A number of metrics require determining the location of boundary pixels for a target object and analyzing the pixels near the boundary. An adaptive thresholding technique identifies foreground and background pixels in a target object. The technique establishes a density range for the foreground and background colors by first computing a density distribution for the isolated image. Then, the mean and the variance for the black and white values is calculated. Densities within 2 or 3 standard deviations (calculated by taking the square root of the variance), of the black mean are considered foreground values. After knowing which values are foreground and background values, the target object is traced and the boundary of the target object is stored as coordinate pairs.

The technique that traces the boundary is known as the Ledley bug follower and described, for example, in Pratt, W. *Digital Image Processing*, (John Wiley & Sons, N.Y. 1978) which is hereby incorporated by reference. This technique locates a starting position on the border of an object and traces the border using a column by column, row by row search for foreground pixels until the original starting position is located again. A foreground pixel is located by finding the first pixel that follows three background pixels in a given row. After locating a pixel in the boundary of an object, the pixel is stored as an X,Y coordinate pair, and the technique checks each of the eight neighboring pixels in a counter-clockwise fashion for the next boundary pixel, beginning with the pixel immediately to the right of the boundary pixel located. If a new boundary pixel is detected, that pixel's position is marked and the search begins again in the same manner. Tracing continues until the technique returns to the initial starting position.

Referring now to FIG. 3A, components of print image analyzer 22 are shown. After the landmark registration process 28 completes, the analysis software computes a set of metrics and, from the results of the measurements, generates quality ratings and printer control signals 31, as discussed below. Print image analyzer 22 may also have a database 32 that stores historical data regarding the image characteristics of digital printer 14 or of other printers of the same model. The historical data is a resource for problems that existed in the past. For example, the historical data may include a table that lists problems in one column and solutions to the respective problem in a second column. A solution can indicate a setting adjustment of digital printer 14. Historical data can also include image characteristics and quality ratings from prior test results that are compared to the current image characteristics and print quality ratings to determine how the quality has degraded over time. Print image analyzer 22 may also have a user interface 34 so that a human can interact with the analysis software.

Metric Computation

Figure 3B:
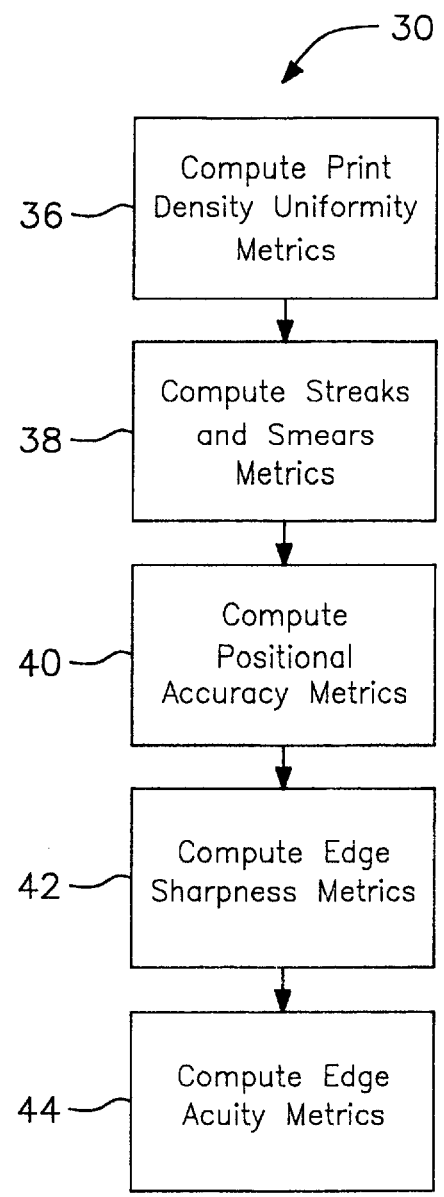
FIG. 3B is a diagram outlining the series of tests conducted by the print analyzer system of FIG. 1.

Referring to FIG. 3B, the metrics computed by the analysis software of the print image analyzer are shown. First, print image analyzer 22 computes the print density uniformity metrics (step 36), which measure variations in the print density for the foreground and the background of the vertical and horizontal solid black target objects 16a, 16b (shown in FIG. 2) and white target objects 16c, 16d (i.e., white space directly to the left and directly above black target objects 16a, 16b respectively). Print density uniformity metrics determine the amount of texture in target objects 16a, 16b, 16c, 16d. The print density uniformity metrics calculated are listed in Table 1.

TABLE 1

Print Density Uniformity Metrics

Average Cluster Size
Variance of Cluster Size
Number and Size of Defects

Figure 4A:
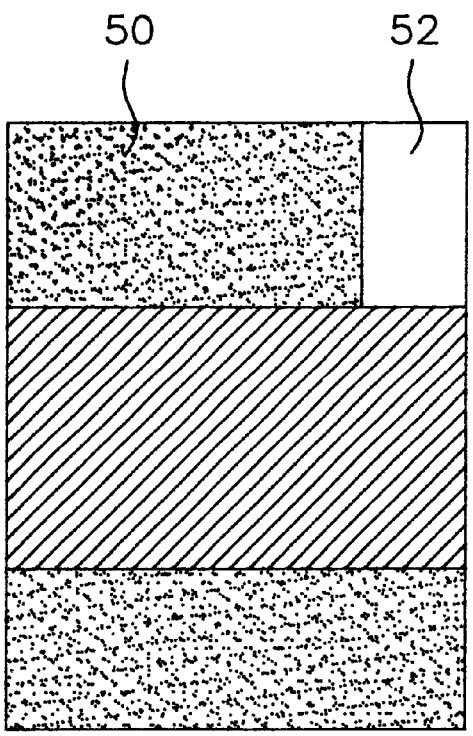
FIG. 4A is an illustration of pixel clusters.

Referring now to FIG. 4A, clusters of pixels are illustrated. A cluster is a group of adjacent pixels having a density that falls within a given range. Ideally, there is only one cluster for a given target object that was intended to be printed as a uniform density object. Typically however, a target object has several pixel clusters that convey texture to the target object. For example, the density range of pixels in clusters 50 and 51 differ from the density range of pixels in cluster 52 and cluster 53.

Figure 4B:
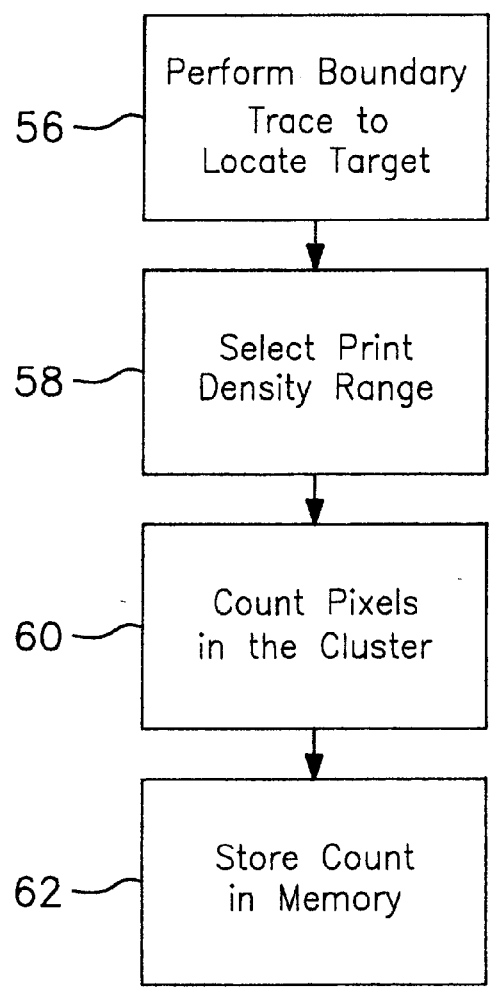
FIG. 4B is a flow chart of the print density uniformity metric.

Referring now to FIG. 4B, steps used to compute print density uniformity metrics (step 36) are shown. A boundary trace is performed to locate the target object (step 56) and a print density range between 0 and 255 is selected (step 58). Within the target object, clusters of pixels having the selected density range are counted (step 60) using a recursive process. The recursive process examines the eight neighboring pixels surrounding a current pixel and marks the neighboring pixel as belonging to the cluster if the neighboring pixel falls within the selected distribution range. The count is stored in memory (step 62). This is done for different density ranges to identify all clusters within the target objects.

The print density uniformity computations then measure the average cluster sizes (i.e., area), the variance of cluster sizes for a range of densities within a selected variation of the mean foreground density ($M_b$ and $M_w$, as calculated above), and the number and sizes of defects. The smaller the cluster sizes, the less noticeable any texture will be, although one large cluster would be ideal. The less varied the cluster sizes the less noticeable the texture will be.

Clusters having density values that are 25% or more from the mean density values are considered defects. A white defect count measures the number and size of voids in a black area. A black defect count measures the speckles or random black spots found in the white area.

Referring back to FIG. 3B, the second set of metrics deals with streaks and smears (step 38). These computations detect streaks and characterize their width, frequency, and density. Listed in Table 2 are the specific metrics and ratings for detecting and characterizing streaks and smears.

TABLE 2

Streaks and Smears Metrics

Side to Side Uniformity
Top to Bottom Uniformity
Number of Streaks
Width of Streaks
Presence of Smearing First, to detect vertical streaks and smears a single row of density values that represents the entire horizontal object 16b is computed. This row of values is referred to as a horizontal density profile. A single pixel in the horizontal density profile is calculated by averaging all values for pixels in the same column of target object 16b. Likewise, a vertical density profile for horizontal target object 16a is produced to detect horizontal streaks and smears. A vertical density profile takes the average of all pixels in a row to generate a single value in the vertical profile.

To measure side-to-side uniformity, a straight line approximation of the horizontal profile is computed using a linear, least-squares fitting method. Any value more than 1 or 2 standard deviations from the mean density is set to the mean density to minimize the effects of streaks. The slope of the line measures how uniform the density is from one side of the target object to the other side of the target object. The density does not vary if the slope is 0. To measure a top-to-bottom uniformity, the same calculations are carried out on the vertical profile.

Figure 4C:
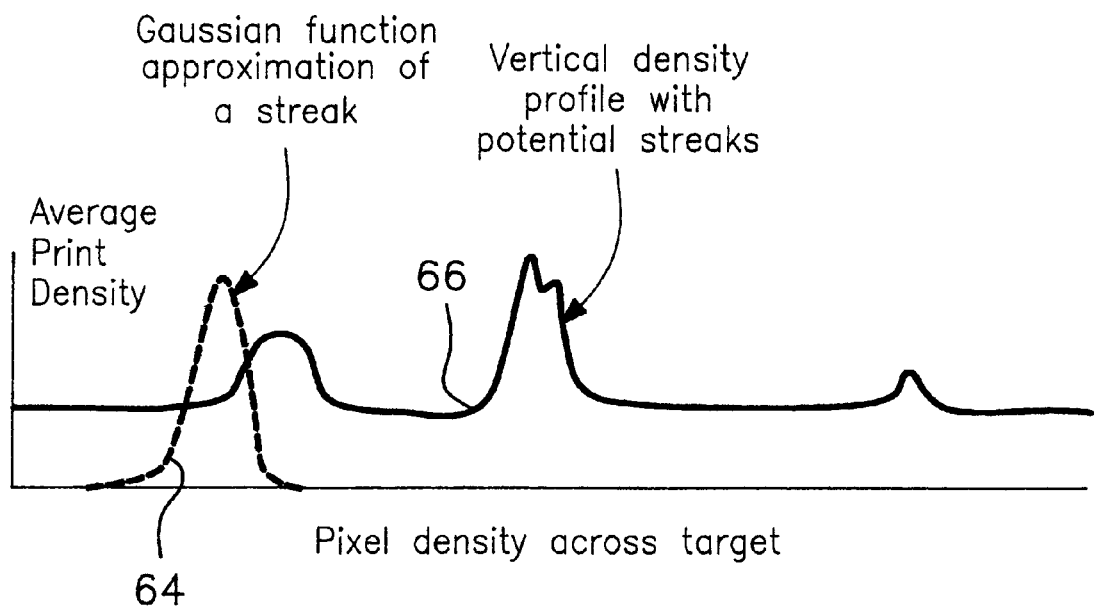
FIG. 4C is a representation of pixel density across a target illustrating a streak condition.

Referring now to FIG. 4C, the presence of streaks is detected by cross correlating a Gaussian function 64 that models a streak density against the profile 66 (either the horizontal or vertical profile). The result of the cross correlation for different positions of the model is stored in an array that is indexed by position. The number of streaks detected and their perceptible visibility are determined by ranking the correlation results and finding those with high correlation values. The width of the streak is established by cross-correlating the profile with streak models having different widths and finding the best match (i.e., the highest correlation value).

Figure 4D:
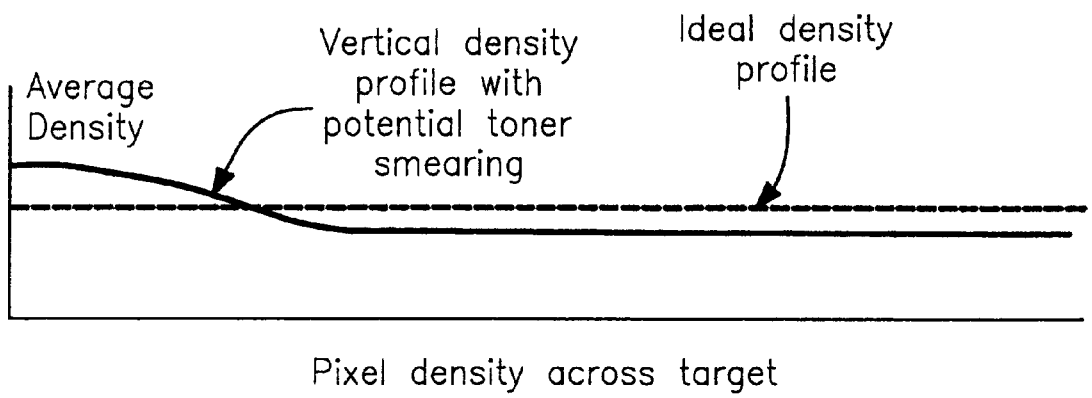
FIG. 4D is a representation of pixel density across a target illustrating a smear condition.

Referring now to FIG. 4D, toner smearing is detected by fitting the horizontal and vertical profile values to a higher order polynomial equation, such as $$D(x)=ax^3+bx^2+cx=d$$

where D is the density value, x is the position or column index within one row, and a, b, c, and d are coefficients of the approximation. Toner smearing could also be detected by approximating the profile as a Fourier Series to measure the degree that the print density deviates from the ideal case of a straight line. When using a polynomial approximation, the second and third order coefficients indicate the degree the profile deviates from a straight line, which would be the first order coefficient. The sum of the absolute value of the magnitude of all non-linear coefficients can be used as an indication of how much the profile deviates from an ideal case.

Referring back to FIG. 3B, the third set of metrics 40 measure positional accuracy by analyzing the consistency by which imaged dots on the printed page are placed in the vertical and horizontal directions. Horizontal positional accuracy is the difference between an actual horizontal position and the expected horizontal position for a vertical line. Vertical positional accuracy is the difference between an actual vertical position and the expected vertical position for a horizontal line. The vertical and horizontal lines in target objects 16f are used for this test. In addition to horizontal and vertical accuracy, which detect jitter, the metric determines the deviation from 90° between a horizontal and a vertical line. Table 3 summarizes the specific metrics and ratings for positional accuracy.

TABLE 3

Positional Accuracy Metrics

Average Deviation from Horizontal Line
Average Deviation from Vertical Line
Deviation from 90°

Positional accuracy metrics also use target objects 16e, which are groups of solid black squares having varying sizes and spaces between squares. Target objects 16e are used to determine jitter and skew.

In calculating the positional accuracy metrics, a boundary trace of the target object (using the Ledley bug follower previous described) is first carried out. To determine horizontal accuracy, a measurement of the difference in the vertical position of a horizontal line over several rows is taken. Vertical accuracy is measured by taking the difference in the horizon position of a vertical line over several columns. Another method for determining vertical and horizontal jitter generates straight line approximations, using a minimum least squares fitting technique, for positions in square target objects and computes the average vertical and horizontal deviation. For a given straight line approximation, the normal distance between each edge point and a straight line is computed using a vector cross-product.

The amount by which adjacent edges of the target deviate from 90 degrees is also measured to determine the amount of skew. The formula that determines the amount of skew uses simple trigonometry and the slopes of the straight line approximations for two adjacent sides of the target object. The equation that determines the angle between the line approximation and the x-axis is $$\theta = \arctan(\Delta Y / \Delta X)$$

Referring once more to FIG. 3B, the fourth set of metrics measure edge sharpness (step 42). Table 4 summarizes the specific metrics and ratings for edge sharpness.

TABLE 4

Edge Sharpness Metrics

Edge Uniformity
Edge Blur

Referring to FIG. 2, edge sharpness metrics use target objects 16e, which are groups of solid block squares having varying sizes and spaces between squares. The blocks vary in size from 1×1 pixel to 60×60 pixels.

Edge sharpness is computed by examining an edge density profile for pixels immediately outside a boundary and computing how close the profile approximates an ideal edge. An edge profile is obtained by averaging the print density of all pixels located one pixel from the boundary, then averaging the print density of all pixels located two pixels from the boundary, and so on up to a predetermined number such as five pixels from the boundary. Each average becomes one value in the profile. From the edge profile, metrics for edge uniformity and edge blur are computed.

Edge uniformity measures the variance of print density when transitioning from the foreground to the background. The measurement sums the variances in the edge profile values. The smaller the sum of the variances is for a given range of pixels, the sharper the edge appears, whereas the larger the sum, the more ragged and blurred the edge appears. A weighted sum of the variances can be used to accentuate the importance of pixels close to the edge versus those farther from the edge.

Edge blur measures how close the edge profile approximates the ideal edge. The ideal edge profile transitions from solid black to white in one or two pixels, almost in a straight-line fashion. Edge blur approximates the edge profile as a straight line and uses the slope of the line approximation as an indication of blur, where the higher the slope the sharper the image and the lower the slope, the longer the transition from black to white and the more blurred the edge appears.

Referring once more to FIG. 3B, the fifth metric computes edge acuity (step 44). Edge acuity measures the ability of digital printer 14 to reproduce detail. The metric has only one component, as shown in Table 5.

TABLE 5

Edge Acuity Metric

Edge Acuity

Referring to FIG. 2, target objects 16f are horizontal, vertical, and 45° lines used for determining edge acuity. The edge acuity metric finds the closest separable line pairs within target objects having pairs of lines separated by varying distances. The spacing between the lines are increased by one printer unit for every line pair. The thickness of the lines can be held constant or varied. To account for imaging capabilities in the horizontal and vertical directions, the test uses three sets of target objects, one with vertical lines, one with horizontal lines, and one with 45° lines.

The edge acuity metric (step 44) locates the lines and computes the distance between the opposing edges of the closest lines. If a separation between the lines is detected, the distance is considered resolvable. When the line pair distances drops below the resolvable capability of the printer, all lines fuse into one object and are considered as one object. This is detected because the size of the identified object is greater than the size of the target (i.e., the identified object would include two or more targets).

Quality Ratings and Printer/Control Signal Generation

Quality ratings and printer control signals are generated from the metrics in process 31 (FIG. 3A). The quality ratings include an overall quality rating and more specific quality ratings, for example with respect to print density uniformity, streaks, smears, positional accuracy, edge sharpness, and edge acuity. To generate the various quality ratings, first the metric values in Tables 1–5 are normalized to values between 0.0 and 1.0 and the weights are applied to the normalized values. For example, a lower natural limit for a metric would be 0.0, and an upper natural limit would be 1.0.

A weight is assigned to each physical measurement listed in Tables 1–5 and defines the relative significance of each measurement to the respective quality rating. The weight is multiplied by the normalized quality rating of the respective test. The overall quality rating is the sum of all the weighted and normalized quality ratings for the individual tests.

Using the quality ratings, print image analyzer 22 can identify factors responsible for a quality deviation and suggest an appropriate corrective action to tune and calibrate digital printer 14 to an acceptable quality level. For example, an unacceptable rating for the presence of smears may indicate that the toner cartridge needs replacing. Furthermore, ratings and weights given to the measurements can depend on the age and model of the digital printing device.

Figure 5:
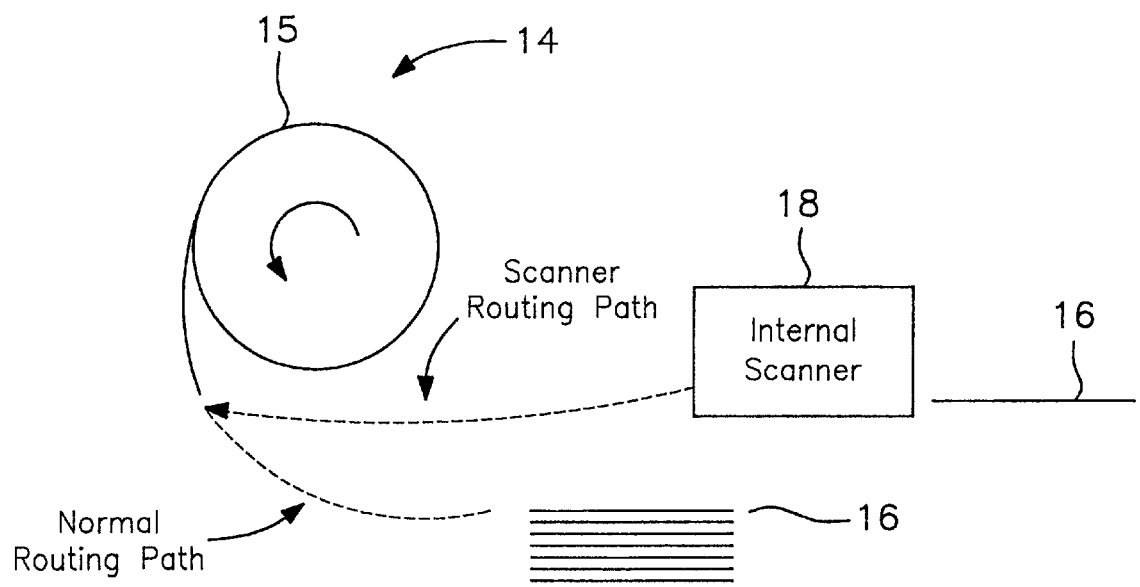
FIG. 5 is a diagram of a printer having a built-in scanner.

Other embodiments are within the scope of the following claims. For example, print image analyzer 22 can be part of the controller firmware of digital printer 14. This embodiment enables digital printer 14 to directly measure its own output quality. FIG. 5 shows scanner 18 built into the output path of digital printer 14 and receiving test pages as needed from printing drum 15. Each time digital printer 14 runs diagnostics, printed image 16 would be printed, scanned, and compared with previous measurements. If the print quality degraded below a threshold or a serious problem were detected, the operator would be alerted by an alarm or light indicator.

Figure 6:
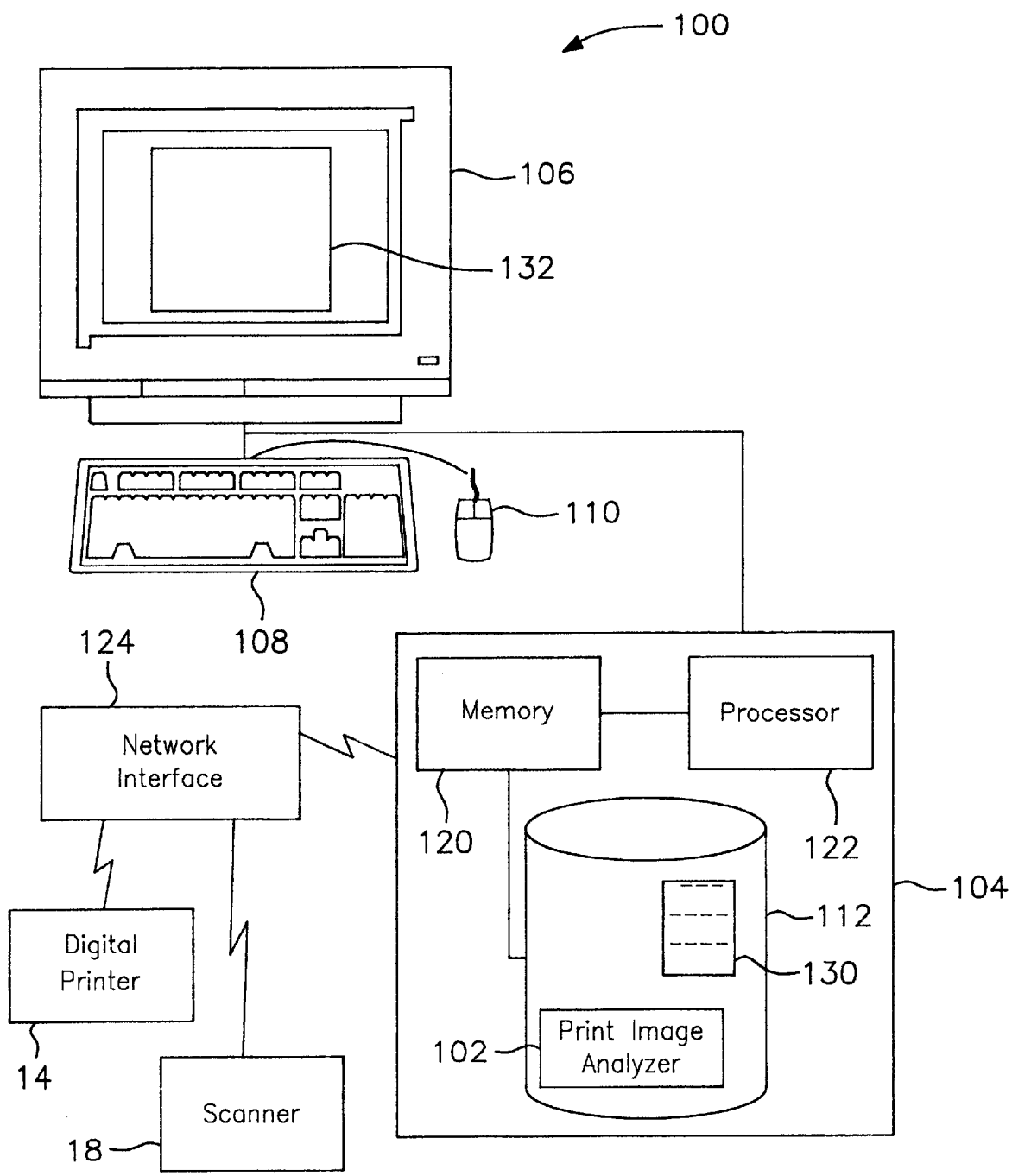
FIG. 6 is a diagram of a computer system having a quality analyzer.

In an alternative embodiment, such as shown in FIG. 6, print image analyzer 22 can be integrated into an image quality assurance system for printers in a distributed system. The results of performing the analysis could be stored locally with each printer or centrally in an administrative site.

In yet another embodiment, print image analyzer 22 can be integrated into a service kit used by a technician to measure image characteristic deviations and determine appropriate corrections. A database could track problems and corrections that correlate with different types of measurements taken from the test sample. A left edge smudge, for example, might correlate with a misaligned toner roller. The initial scan of the printed page provides the technician with a list of potential problems and likely corrections. Once the problem is identified and corrected, the technician updates the database with the information.

Print image analyzer 22 can be integrated into a printer's test fixture to provide continuous on-line measurements of print image characteristics. This would be especially useful for high volume printers that require large volumes of output to show significant quality changes. The ability to continuously sample the print output, plot variations, and correlate those results enables a printer manufacturer to predict quality degradation and thus reduce testing costs.

Print image analyzer 22 can also be used to provide on-line metrics for a printer manufacturer's quality assurance or research and development departments.

FIG. 6 shows a computer system 100 suitable for supporting one or more print image analyzers 102. The computer system 100 includes a digital computer 104, a display monitor 106, a keyboard 108, a mouse or other pointing device 110, and a mass storage device 112 (e.g., hard disk drive, magneto-optical disk drive, or floppy disk drive). The computer 104 includes memory 120, a processor 122, and other customary components, such as, memory bus and peripheral bus (not shown). The computer 104 has a network interface 124 to communicate with remote computer systems. Digital printer 14 and scanner 18 also connect to network interface 124.

In place of bitmaps, the test pattern data can be in the form of page description language such as PostScript or HP's printer control language (PCL).

What is claimed is:

1. A method of measuring image characteristics of printed output from a digital printer, comprising:

sending test pattern data for a test pattern to a digital printer, said test pattern including one or more target objects designed to reveal one or more specific printed image characteristics;

generating a printed image of said test pattern data at said digital printer;

scanning said printed image to obtain digital pattern data; and analyzing said digital pattern data to generate one or more quantitative ratings with respect to said one or more printed image characteristics, said one or more quantitative ratings being evaluated with respect to historical data.

2. The method of claim 1, wherein a printed test pattern is scanned prior to sending said test pattern data to said digital printer.

3. The method of claim 1, wherein said analyzing includes generating a quality rating related to image quality from said one or more quantitative ratings.

4. The method of claim 3, wherein said quality rating is based on a human perception of quality.

5. The method of claim 3, wherein a scanner used for the step of scanning has higher resolution than said digital printer.

6. The method of claim 1, further comprising:

indicating unacceptable print quality in response to said one or more quantitative ratings.

7. The method of claim 1, further comprising:

indicating a setting adjustment to said digital printer in response to said one or more quantitative ratings.

8. The method of claim 1, further comprising:

automatically adjusting a setting to said digital printer in response to said one or more quantitative ratings.

9. The method of claim 1, wherein said quantitative ratings include a physical measurement of said one or more target objects in said digital pattern data.

10. The method of claim 9, wherein landmarks in said digital pattern data are used to identify positions for said one or more target objects.

11. The method of claim 10, wherein said landmarks are located in corners of said digital pattern data.

12. The method of claim 10, wherein said landmarks are used to adjust for scanner deviations.

13. The method of claim 9, wherein said physical measurement determines density uniformity.

14. The method of claim 9, wherein said physical measurement determines positional accuracy.

15. The method of claim 9, wherein said physical measurement determines edge sharpness.

16. The method of claim 9, wherein said physical measurement determines edge acuity.

17. The method of claim 9, wherein said physical measurement detects a presence of streaks and smears.

18. The method of claim 1, wherein said analyzing step produces a plurality of physical measurements of said digital pattern data.

19. The method of claim 18, further comprising:
combining said physical measurements into a quality rating.

20. The method of claim 19, wherein said combining step comprises:
producing a plurality of weights, each weight assigned to one of said plurality of physical measurements;
normalizing said plurality of physical measurements;
computing said quality rating by multiplying each of said plurality of weights by a respective one of said normalized physical measurements to generate products; and
summing the products of said weights and said measurements into one overall quality rating.

21. The method of claim 1, wherein said analyzing step identifies a plurality of factors responsible for quality deviation and suggests appropriate corrective action.

22. The method of claim 1, wherein said analyzing step uses a database with historical data unique for the digital printer.

23. The method of claim 1, wherein said analyzing step uses a database with quality data correlated with printer setting adjustments.

24. The method of claim 1, wherein said test pattern data includes samples of horizontal and vertical lines.

25. The method of claim 24, wherein said horizontal and vertical lines are separated by different distances.

26. The method of claim 1, wherein the test pattern data is stored as a bitmap data or represented as a page in a page description language.

27. A computer program, residing on a computer-readable medium, comprising instructions causing a print analyzer system to:
produce digital test pattern data for a test pattern, said test pattern including one or more target objects designed to reveal one or more specific printed image characteristics;
send said digital test pattern data to a digital printer to generate a printed image at said digital printer;
receive digital pattern data generated from scanning said printed image, said digital pattern data having a higher resolution than said printed image; and
analyze said digital pattern data to generate one or more quantitative ratings with respect to said one or more printed image characteristics.

28. The computer program of claim 27, wherein analyzing of said digital pattern data includes generating a quality rating related to image quality from said one or more quantitative ratings.

29. The computer program of claim 27, further comprising instructions causing a print analyzer system to:
indicate a setting adjustment to said digital printer in response to said one or more quantitative ratings.

30. The computer program of claim 27, further comprising instructions causing a print analyzer system to:
automatically adjust a setting to said digital printer in response to said one or more quantitative ratings.

31. The computer program of claim 27, wherein said quantitative ratings include a physical measurement of said one or more target objects in said digital pattern data.

32. The computer program of claim 27, wherein analyzing of said digital pattern data produces a plurality of physical measurements of said digital pattern data and further comprising instructions to cause a print analyzer system to combine said physical measurements into a quality rating.

33. The computer program of claim 27, further comprising instructions causing a print analyzer system to:
read historical data in a database; and
evaluate said one or more quantitative ratings with said historical data.

34. A print analyzer system for measuring image characteristics of printed output from a digital printer, comprising:
a source of digital test pattern data for a test pattern, said test pattern including one or more target objects designed to reveal one or more specific printed image characteristics;
a digital printer that receives said digital test pattern data as input and outputs a printed image;
a scanner that receives said printed image as input and outputs digital pattern data having higher resolution than said printed image;
an image quality analyzer receiving said digital pattern data and analyzing said digital pattern data to generate one or more quantitative ratings with respect to one or more printed image characteristics; and
a database with historical data for said digital printer.

35. The print analyzer system of claim 34, further comprising:
a database with quality data correlated with printer setting adjustments.

36. A test instrument for measuring image characteristics of printed output from a digital printer, comprising:
an input that receives printed digital pattern data based on scanning an image printed by a digital printer in response to test pattern data for a test pattern, said test pattern including one or more target objects designed to reveal one or more specific printed image characteristics;
an analyzer to receive said digital pattern data and analyze said digital pattern data to generate one or more quantitative ratings with respect to said one or more printed image characteristics;
an output responding to said one or more quantitative ratings; and
a database having historical data for said digital printer.

37. The test instrument of claim 36, wherein said analyzer identifies factors responsible for quality deviation.

38. The test instrument of claim 36, wherein said analyzer generates a quality rating related to image quality from said one or more quantitative ratings.

39. The test instrument of claim 36, further comprising:
a setting adjustment indicator to respond to said one or more quantitative ratings.

40. The test instrument of claim 36, wherein said output automatically adjusts a setting to said digital printer.

41. The test instrument of claim 36, wherein said quantitative ratings include a physical measurement of said one or more target objects in said digital pattern data.

42. The test instrument of claim 36, wherein said analyzer produces a plurality of physical measurements of said digital pattern data and combines said physical measurements into a quality rating.

43. The test instrument of claim 36, wherein said analyzer suggests appropriate corrective action.

44. The test instrument of claim 36, further comprising:
a database having quality data correlated with said digital printer setting adjustments.

45. A method of measuring image characteristics of printed output from a digital printer, comprising:
sending test pattern data for a test pattern to a digital printer, said test pattern including one or more target objects designed to reveal one or more specific printed image characteristics;
generating a printed image of said test pattern data at said digital printer;
scanning said printed image with a scanner to obtain digital pattern data, said scanner having a higher resolution than said digital printer; and
analyzing said digital pattern data to generate one or more quantitative ratings with respect to said one or more printed image characteristics, and generating a quality rating related to image quality from said one or more quantitative ratings.

46. A method of measuring image characteristics of printed output from a digital printer, comprising:
sending test pattern data for a test pattern to a digital printer, said test pattern including one or more target objects designed to reveal one or more specific printed image characteristics;
generating a printed image of said test pattern data at said digital printer;
scanning said printed image to obtain digital pattern data; and
analyzing said digital pattern data to generate one or more quantitative ratings with respect to said one or more printed image characteristics, said step of analyzing producing a plurality of physical measurements of said digital pattern data;
combining said plurality of physical measurements into a quality rating, said step of combining including the steps of,
producing a plurality of weights, each weight assigned to one of said plurality of physical measurements,
normalizing said plurality of physical measurements,
computing said quality rating by multiplying each of said plurality of weights by a respective one of said normalized physical measurements to generate products, and
summing the products of said weights and said measurements into one overall quality rating.

47. A method of measuring image characteristics of printed output from a digital printer, comprising:
sending test pattern data for a test pattern to a digital printer, said test pattern including one or more target objects designed to reveal one or more specific printed image characteristics;
generating a printed image of said test pattern data at said digital printer;
scanning said printed image to obtain digital pattern data; and
analyzing, using a database with historical data unique for the digital printer, said digital pattern data to generate one or more quantitative ratings with respect to said one or more printed image characteristics.

48. A computer program, residing on a computer-readable medium, comprising instructions causing a print analyzer system to:
produce digital test pattern data for a test pattern, said test pattern including one or more target objects designed to reveal one or more specific printed image characteristics;
send said digital test pattern data to a digital printer to generate a printed image at said digital printer;
receive digital pattern data generated from scanning said printed image;
analyze said digital pattern data to generate one or more quantitative ratings with respect to said one or more printed image characteristics;
read historical data in a database; and
evaluate said one or more quantitative ratings with said historical data.

49. The computer program of claim 48, wherein analyzing of said digital pattern data includes generating a quality rating related to image quality from said one or more quantitative ratings.

50. The computer program of claim 48, further comprising instructions causing a print analyzer system to:
indicate a setting adjustment to said digital printer in response to said one or more quantitative ratings.

51. The computer program of claim 48, further comprising instructions causing a print analyzer system to:
automatically adjust a setting to said digital printer in response to said one or more quantitative ratings.

52. The computer program of claim 48, wherein said quantitative ratings include a physical measurement of said once or more target objects in said digital pattern data.

53. The computer program of claim 48, wherein analyzing of said digital pattern data produces a plurality of physical measurements of said digital pattern data and further comprising instructions to cause a print analyzer system to combine said physical measurements into a quality rating.

* * * * *